United States Patent [19]

Seki et al.

[11] 3,882,153

[45] May 6, 1975

[54] METHOD FOR RECOVERING FLUORINATED CARBOXYLIC ACID

[75] Inventors: Shigeru Seki; Koji Sato, both of Iwaki, Japan

[73] Assignee: Kureha Kagaku Kogyo Kabushiki Kaisha, Tokyo, Japan

[22] Filed: Apr. 4, 1973

[21] Appl. No.: 347,665

Related U.S. Application Data

[63] Continuation-in-part of Ser. No. 70,916, Sept. 9, 1970, abandoned.

[30] Foreign Application Priority Data

Sept. 12, 1969 Japan.............................. 44-72483

[52] U.S. Cl............. 260/408; 260/404; 260/539 R; 260/29.6 F; 260/19.6 PT; 260/87.5 A
[51] Int. Cl. ........................ C07c 51/42; C08f 1/88
[58] Field of Search ........... 260/408, 539 R, 29.6 F, 260/29.6 PT

[56] References Cited
UNITED STATES PATENTS

| | | | |
|---|---|---|---|
| 2,580,325 | 12/1951 | Scott et al............................ | 210/24 |
| 2,863,889 | 12/1958 | Marks................................ | 260/408 |

*Primary Examiner*—Alton D. Rollins
*Assistant Examiner*—Diana G. Rivers
*Attorney, Agent, or Firm*—Wenderoth, Lind & Ponack

[57] ABSTRACT

Fluorinated carboxylic acid is efficiently recovered by passing its diluted solution in adsorptive contact with a weak basic anion-exchange resin to cause the fluorinated carboxylic acid contained in the diluted solution to be absorbed onto the anion-exchange resin, then eluting the anion-exchange resin with an aqueous ammonia solution to transfer the adsorbed fluorinated carboxylic acid to the eluent.

5 Claims, No Drawings

METHOD FOR RECOVERING FLUORINATED CARBOXYLIC ACID

CROSS-REFERENCE TO THE RELATED APPLICATION

This is a continuation-in-part application of the copending application Ser. No. 70,916, filed Sept. 9, 1970, for "Method for Recovering Perfluorocarboxylic Acid", which application is now abandoned.

BACKGROUND OF THE INVENTION

This invention relates to a method for recovering a fluorinated carboxylic acid which is used for the emulsion-polymerization of fluorine-containing olefins.

The fluorinated carboxylic acid has a generally high surface activating capability, and exhibits an exceedingly superior surface activity at a low concentration. It can be used in special circumstances where ordinary surface active agents cannot be successfully used. For instance, it can be used as an emulsifier even for the emulsion-polymerization of fluorine-containing olefins, wherein the ordinary emulsifier acts as a polymerization inhibitor to prevent the polymerization from being accomplished.

On the other hand, however, an emulsifier of ordinary use not containing fluorine is usually adsorbed in a considerably large quantity on the surface of a polymer particles obtained by the ordinary emulsion-polymerization, and the effective isolation of this emulsifier from the surface of the polymer is difficult. Even if it is isolated from the polymer latex, the concentration of the emulsifier in the recovered liquid is extremely dilute. On the other hand, it has been discovered that a fluorinated carboxylic acid and its salts as an emulsifier existing in a polymer latex obtained from the emulsion-polymerization of a fluorinated olefin can be easily separated in its larger part from the polymer latex, by agglomeration of the polymer followed by filtration and washing by distilled water of the same, and is recoverable as an aqueous solution of the fluorinated carboxylic acid and the salt thereof.

As an example of the above, a comparison is made between the recovery of an emulsifier from a latex obtained by the emulsion-polymerization of vinyl chloride (VC) and that from a latex obtained by the emulsion-polymerization of vinylidene fluoride (VDF). The result is as follows.

| LATEX | EMULSIFIER | RATE OF RECOVERY |
|---|---|---|
| VC | sodium alkyl-benzene sulfonate | 12.8% |
| VDF | perfluoro-octanoic acid | 71.4% |

In this comparative measurements, each of the latexes was treated with an aqueous solution of sodium chloride (NaCl) to agglomerate the polymer, and then the polymer was filtered, and thereafter washed three times with water. The emulsifier content in the remaining filtered liquid was measured to determine the rate of recovery.

Thus, the fluorinated carboxylic acid emulsifier can be separated from the polymer in a much easier way than the ordinary emulsifier, and can be extracted in the form of an aqueous solution.

Since a fluorinated carboxylic acid is produced by a very unique process of electrolytic fluorination, telomerisation of tetrafluoroethylene, the compound is very expensive, hence the cost of the emulsifier occupying the total production cost of the polymer is considerable. Consequently, recovery from the polymer latex of the fluorinated carboxylic acid as the emulsifier is highly significant from the standpoint of economy in the production cost.

SUMMARY OF THE INVENTION

It is therefore the primary object of the present invention to provide an easy and effective method of recovering the emulsifier from a dilute aqueous solution of a fluorinated carboxylic acid or the salts thereof existing in the mother liquid resulting from the separation by agglomeration of a polymer latex of a polymerized fluorinated olefin by the emulsion-polymerization, or in a waste liquid obtained from washing, dehydrating and other operations performed on the resulted polymer.

DETAILED DESCRIPTION OF THE INVENTION

The above-mentioned object as well as principle of the present invention will become more apparent from the following detailed description of the invention accompanied by some preferred embodiments thereof.

The fluorinated carboxylic acid as used in the present invention is one representable by the following general formula: $X+CYZ\text{-}CF_2 \!\!\rightarrow_{\!\!n}\!\! COOM$, wherein the total number of carbons contained in the fluorinated alkyl group $X+CYZ\text{-}CF_2\!\!\rightarrow_{\!\!n}$ ranges from 5 to 13; X designates any one of H, Cl, F, $CF_3$, or $CF_2Cl$ Y represents hydrogen or fluorine; Z represents any one of hydrogen, chlorine, or fluorine; M denotes either H, $NH_4$, K, or Na; and n is an integer of 2 to 6. Such a fluorinated carboxylic acid is usually produced by oxidation reaction, etc. of a telomer of vinylidene fluoride, chloro-trifluoro-ethylene, or tetrafluoroethylene, or electrolytic fluorination of corresponding non-fluorinated carboxylic acids or salts thereof. Examples of such fluorinated carboxylic acids are: $CF_3+CF_2\text{-}CF_2\!\!\rightarrow_{\!\!m}\!\!COOH$ (m = 2 to 4), $CF_2Cl+CF_2\text{-}CF_2\!\!\rightarrow_{\!\!m}\!\!COOH$ (m = 2 to 4), $H+CF_2\text{-}CF_2\!\!\rightarrow_{\!\!m}\!\!COOH$ (m = 2 to 5), $Cl+CF_2\text{-}CFCl\!\!\rightarrow_{\!\!m}\!\!CF_2 COOH$ (m = 2 to 6), $F+CF_2\!\!\rightarrow_{\!\!m}\!\!COOH$ (m = 5 to 11), $Cl+CF_2\text{-}CH_2\!\!\rightarrow_{\!\!m}\!\!CF_2\text{-}COOH$ (m = 2 to 6), and potassium, sodium, and ammonium salts thereof. These fluorinated carboxylic acids, when they are used as the emulsifier for the emulsion-polymerization of a fluorinated olefin, are employed in the form of acid, or sodium, potassium, or ammonium salts thereof, or a mixture of these acids and salts. Accordingly, diluted solutions of fluorinated carboxylic acids obtained from washing and dehydration of the resulted polymer after it is agglomerated from the polymer latex are considered to be mixtures of these acids and salts.

Concentration of the emulsifier in the latex varies, depending on the concentration of the resulted polymer. However, it is usually more than the minimum concentration for the formation of miscelle (approximately 0.01 percent) and less than 1 percent. The concentration of the fluorinated carboxylic acid in the dilute solution from both the filtered liquid after agglomeration of the resulted polymer and from the washed liquid for the separated polymer is far less than that, i.e., a few fractions thereof.

As methods for recovering the fluorinated carboxylic acid, there are some methods which recover the same in the form of the metallic salt, and by evaporative concentration of a solvent, although these methods will be unavoidably less efficient when the solution is extremely dilute.

We have found, as the result of experiments and studies that the use of an ion-exchange resin is the best way to recover such costly emulsifier. That is, we have succeeded in capturing a fluorinated carboxylic acid by adsorbing the same from a dilute solution thereof with an anion-exchange resin. This is an adequate way of recovery, when considering the fact that a fluorinated carboxylic acid dissolves in the solution as an anion. According to this method, the emulsifier can be recovered extremely rapidly and at higher efficiency in comparison with other known methods. In addition, the more dilute the solution, the more effective this method becomes.

Furthermore, according to the present invention, various sorts of cationic and nonionic substances are separated with the discharge liquid without being adsorbed on the ion-exchange resin. resin. Also, certain anionic substances, e.g. chlorine (Cl) ion, are not adsorbed on the ion-exchange resin along with a fluorinated carboxylic acid, but are discharged outside. Thus, it is considered highly effective that a fluorinated carboxylic acid can be captured by adsorption, while maintaining its selective adsorptibility with respect to other anionic, cationic, and nonionic substances.

However, this fluorinated carboxylic acid once adsorbed on the anion-exchange resin is in general difficult to be separated therefrom by elution. According to the extensive study made by the present inventors, it has been discovered that, when a strong basic anion exchange resin is used for the adsorption, the fluorinated carboxylic acid already exchange-adsorbed on the ion-exchange resin is hardly eluted, which makes it extremely difficult to regenerate the ion-exchange resin, hence the intended recovery of the fluorinated carboxylic acid is very poor in its rate of recovery.

On the other hand, it has been made clear that, when a weak basic anion exchange resin is used for capturing a fluorinated carboxylic acid by adsorption, isolation of the thus exchange-absorbed fluorinated carboxylic acid by elution can be effected very easily, and regeneration of the anion-exchange resin can be realized at the same time.

The reason for the above difference is considered to be that the strong basic anion-exchange resin possesses too large affinity with the fluorinated carboxylic acid thus resulting in consequent difficulty in elution of the latter.

The weak basic anion-exchange resins referred to in the present invention designate those substances having the following characteristics:

a. To have at least one amine group, as an exchange group, selected from primary, secondary, and tertiary amines such as, for example, $-NR_2X$, $-NRHX$, $-NH_2X$, and so forth;

b. To have similar properties to ordinary weak bases; and c. To have a pH value of a range of 0 to 7 (a region between acidity and neutrality) which enables the exchange-adsorption to be effected, hence the substance is either able to exchange-adsorb a strong acidic radical such as chlorine by decomposing a salt of a strong acidic radical and a weak basic radical, e.g., $NH_4Cl$, or is very low in its capability of decomposing a neutral salt like NaCl, or is almost unable to exchange-adsorb the anion in such neutral salt.

Examples of such weak basic anion exchange resin are:

"AMBERLITE IRA-93," "AMBERLITE IRA-68" (products of Rohm and Haas Co., which are styrene-divinyl benzene type resin containing therein a tertiary amine), "DIAION WA-20" (a product of Mitsubishi Kasei Kogyo K.K., Japan, which is a styrene-divinyl benzene type resin containing therein primary and secondary amines), "DIAION WA-30" (a product of Mitsubishi Kasei Kogyo K.K., Japan, which is a styrene-divinyl benzene type resin containing therein a tertiary amine, "DIAION WA-10" (a product of Mitsubishi Kasei Kogyo K.K., Japan, which is an acrylate-divinyl benzene type resin containing therein tertiary amine), and so forth.

In order to isolate a fluorinated carboxylic acid by adsorbing in on the above-mentioned weak basic anion-exchange resin from dilute aqueous solution thereof, which has been recovered from a treatment of the emulsion-polymerized latex of a fluorinated olefin, it is desirable that the aqueous solution of the fluorinated carboxylic acid is adjusted to a pH value in the region of acidity, or more preferably at a pH value of 4 or below, at which value the emulsifier is caused to contact the weak basic anion-exchange resin. Also, the concentration of the fluorinated carboxylic acid should range between 0.05 and 20 m mole/liter, or more preferably, from 0.1 to 10 m mole/liter. If the concentration is below this lower limit, the rate of adsorption is inferior, hence efficiency in the recovery is low. On the other hand, when the concentration exceeds the upper limit, the emulsifier exists in the solution at a rate higher than its solubility with the result that it cannot be present in a state of solution, which is not desirable from the standpoint of its contact with the exchange resin.

In the above described manner, the fluorinated carboxylic acid is adsorbed on the ion-exchange resin by contacting a dilute aqueous solution of the fluorinated carboxylic acid with a weak basic anion exchange resin, after which the ion-exchange resin is separated from the aqueous solution, and the thus separated resin is caused to contact an eluent in accordance with the ordinary method of isolating, by elution, fluorinated carboxylic acid adsorbed on the ion-exchange resin into the eluent. In this eluent, the fluorinated carboxylic acid is highly concentrated, in which eluent there co-exist cations such as $Na^+$, $K^+$, $NH_4^+$, $H^+$, and so on, depending on the kind of an eluent used.

Moreover, an aqueous solution of $NH_3$ has been found highly effective for this adsorbed emulsifier. That is, when mineral acids such as HCl, $H_2SO_4$, $HNO_3$, etc. were used as the eluent, no effect at all could be obtained. Also, when aqueous solutions of NaOH and KOH are used as the eluent, the ratio of elution of the emulsifier from the ion-exchange resin is less than a half of that in the case of using the aqueous solution of $NH_3$. The fact that the mineral acids are not efficacious as the eluent, and that, of various alkaline solutions, an aqueous solution of $NH_3$ is particularly effective for use as the eluent are considered very unique, and could not be inferred from the ordinary knowledge of skilled artisans. This unique feature is considered attributable to the inherent property of the fluorinated carboxylic acid per se. That is, the solubility of the fluorinated carboxylic acid is extremely small in mineral acids, and is much larger in an aqueous solution of $NH_3$ than in the aqueous solutions of NaOH and KOH.

An appropriate concentration of the $NH_3$ aqueous solution to be used in the present invention may be in the range of from 0.5 to 2.0 normal.

The fluorinated carboxylic acid thus concentrated and recovered in the eluent, due to its high concentration, can be readily taken out in the form of a pure fluorinated carboxylic acid or in the form of salts thereof by known methods, such as acid-deposition, saltingout, concentration, and so forth.

The present invention can be carried out either in a batch method or a continuous method.

PREFERRED EMBODIMENT

In order to enable the persons skilled in the art to readily put this invention into practice, the following preferred examples are presented. It should, however, be noted that these examples are illustrative only, and they do not intend to limit the scope of the present invention as set forth in the appended claims. Rather, any change and modification may be arbitrarily made within the ambit of the present invention as disclosed in this specification.

EXAMPLE 1

"AMBERLITE IRA-410," a strong basic anion exchange resin, was charged in a glass tube of 8 mm, inner diameter in a quantity of 10 ml. through which 40 ml. of 1 normal HCl solution was caused to pass, thereafter it was rinsed with 1 liter of distilled water. The passing speed of these liquids was 40 ml./hr.. Into this charged glass tube, an aqueous solution (pH = 1.9) of perfluoro-octanoic acid, "FLUORADE EC-26," of a concentration of 3.1 m mole/liter was passed. The passing speed of the liquid at this time was 100 ml./hr..

Besides the above, 10 ml. of "AMBERLITE IRA-93," a weak basic anion exchange resin, was treated in the same manner as in "AMBERLITE IRA-410," and then 1.97 m mol/liter of an aqueous solution of "FLUORADE FC-26" was passed therethrough, whereupon perfluorooctanoic acid was adsorbed on this ion-exchange resin upto its break-through point. Then, 40 ml of 1 normal $NH_3$ aqueous solution was caused to pass through the respective tubes, thereafter passing 100 ml. of distilled water to elute perfluorooctanoic acid from the ion-exchange resin. The passing speed of the liquid at this time was 40 ml./hr..

The following comparative results were obtained.

(Table 1)

| Ion-Exchange Resin | IRA-410 (strong base) | IRA-93 (weak base) |
|---|---|---|
| Adsorbed Qty. (m mol/liter) | 5.457 | 7.347 |
| Rate of Adsorption (%) | 95.9 | 95.6 |
| Rate of Elution (%) | 0.7 | 88.5 |

As is apparent from the above Table 1, the strong basic resin is remarkably inferior to the weak basic resin in its rate of elution. Almost no recovery of perfluoro-octanoic acid is seen with the strong basic resin. Accordingly, the weak basic anion exchange resin is greatly advantageous for the purpose of the present invention.

EXAMPLE 2

In the same manner as in Example 1, 23.2 m mole per liter of perfluoro-octanoic octanic acid ("FLUORADE FC-26") was caused to adsorb onto 50 ml. of "AMBERLITE IRA-93," after which 100 ml. of 1 normal NaOH aqueous solution was passed and then 100 ml. of distilled water was passed. The passing speed of the liquids at this time was 200 ml./hr.. The resulted rate of elution was 10.34 percent.

Next, in exactly same manner, 38.40 m mole per liter of perfluoro-octanoic acid was caused to adsorb onto 50 ml. of "IRA-93," after which 80 ml. of 1 normal $NH_3$ aqueous solution was passed and then 70 ml. of distilled water was passed. The passing speed of the liquids was 200 ml./hr.. The resultant rate of elution was 94.7 percent.

(Table 2)

| Eluting Agent | Adsorbed Quantity (m mol/liter) | Rate of Elution (%) |
|---|---|---|
| NaOH (100 ml) | 23.2 | 10.34 |
| $NH_3$ ( 80 ml) | 38.40 | 94.7 |

From the above results, it is evident that $NH_3$ aqueous solution is extremely effective as the eluent.

EXAMPLE 3

In the same manner as in Example 1, 0.628 mole per liter of perfluoro-octanoic acid was caused to adsorb onto "AMBERLITE IRA-93."

10 ml each of this ion-exchange resin was then sampled, and $NH_3$ aqueous solution of four different concentrations were passed through each of the sampled resins to find out the rate of elution of perfluorooctanoic acid relative to the $NH_3$ concentration. The quantity of the eluting agent for each concentration was 40 ml. Thereafter, 50 ml. of distilled water was passed. The passing speed of these liquids was 40 ml./hr..

(Table 3)

| Concentration of $NH_3$ Aqueous Solution (Normal) | Rate of Elution (%) | Coefficient of Concentration |
|---|---|---|
| 0.46 | 79.3 | 20.9 |
| 0.76 | 90.9 | 25.7 |
| 1.34 | 94.8 | 25.1 |
| 2.34 | 64.1 | 17.3 |

As it clear from the above Table, the preferable range of the concentration of the eluent is from 0.5 to 2.0 normal.

EXAMPLE 4

Into an autoclave of 6 liter-capacity, there were charged 3,200 cc of de-ionized water, 8 g of acetone, 2.4 g of sodium perfluoro-octanoate, and 26 cc of $H_2O_2$ of 30 percent concentration, after which nitrogen-substitution was conducted twice at a rate of 5 kg/cm², and then the pressure within the autoclave was reduced to 100 mm Hg to completely expel oxygen therefrom.

After the autoclave was cooled to a temperature of 5°C, 800 g of vinylidene fluoride monomer was charged thereinto under pressure. The temperature within the autoclave was raised to 110°C, while agitating the batch, at which temperature it was maintained during the polymerization reaction. The pressure within the autoclave was elevated to 86 kg/cm$^2$, after which it was rapidly lowered. When the pressure decreased from its maximum point by 5 kg/cm$^2$, 96 cc of 10 percent solution of sodium perfluoro-octanoate was charged under pressure into the autoclave. After 4 hours' polymerization, the pressure was reduced to 50 kg/cm$^2$, whereupon approximately 1,800 cc of de-ionized water continuously added to maintain the pressure at that level. The polymerization was stopped after 9.5 consecutive hours. The polymerization yield was 83 percent. The concentration of the perfluoro-octanoate in the polymer latex was 0.214 percent.

Next, 300 cc of water containing therein 50 g of NaCl was added to this latex for salting-out. The cake product obtained by filtering the salted-out substance contained about 50 percent of water. 4 kg of de-ionized water was then added to this cake for washing and filtering. The filtered liquid was mixed with the filtered liquid obtained from filtration of the previously salted-out substance. This washing step was repeated three times.

The rate of recovery of perfluoro octanoic acid and its sodium salt as the emulsifier which was separated by washing and filtering of the resulted polymer latex after salting-out in each stage is shown in the following Table 4. The liquids recovered by the washing step were all mixed in the same vessel to be a liquid of uniform concentration of the emulsifier of 0.05%.

(Table 4)

| Filtered Liquid | Rate of Recovery of Perfluoro Octanic Acid & Sodium Salt (%) |
|---|---|
| After dehydration | 31.4 |
| After first washing | 25.7 |
| After second washing | 8.15 |
| After third washing | 6.15 |
| Total | 71.4 |

This recovered filtered liquid was caused to pass through a column of 16 mm in inner diameter filled with 50 ml. of weak basic anion exchange resin "AMBERLITE AIR-93," a product of Rohm & Haas, from its top at a flow rate of 500 ml. per hour, whereupon the perfluoro-octanoic acid group in the filtered liquid was adsorbed on the anion exchange resin. Thereafter, 200 ml. of 1.1 normal aqueous solution of NH$_3$ and, subsequently 500 milli-liters of de-ionized water were also caused to pass through the same column from its top at a flow rate of 200 ml. per hour to elute the perfluoro-octanoic acid from the anion-exchange resin, which had been adsorbed thereon. In the eluted liquid thus obtained, there was present perfluoro-octanoic acid in the form of its ammonium salt, the concentration of which was 1.11 percent. The rate of recovery of the perfluoro-octanoic acid was shown to be 90% with respect to the quantity of perfluoro-octanoic acid and the sodium salt thereof in the filtered liquid as recovered.

EXAMPLE 5

Into an autoclave of a 6-liter capacity, there were charged 4,800 g of de-ionized water, 9.6 g of 70 percent sodium salt of perfluoro-octanoic acid, 9 ml. of 35 percent hydrogen peroxide, and 3.6 ml. of 1 percent aqueous solution of Fe(NO$_3$)$_3$. After the pH value of the charge was adjusted to 3.0, the oxygen remaining within the autoclave was removed in the same manner as in Example 4 above, and the temperature of the autoclave was lowered to 5°C. Subsequently, tetrafluoroethylene was introduced into this 6-liter autoclave from another autoclave of 1.5-liter capacity, in which 480 g of tetrafluoroethylene was previously charged under pressure and which was connected to the 6-liter autoclave through a pressure-resistant stainless steel pipe having a valve, by opening the valve to communicate both autoclaves. After the required quantity of tetrafluoroethylene was transferred to the 6-liter autoclave, the connecting valve was closed, and the polymerization was commenced by raising a temperature to 80°C. The pressure at the start of the polymerization was 60 kg/cm$^2$. After 30 minutes from the start of the polymerization, the pressure within the autoclave began to decrease, and, when the internal pressure became as low as 20 kg/cm$^2$, the connecting valve was opened, and subsequently, from a separate inlet port, de-ionized water was charged under pressure into the 1.5-liter autoclave so as to transfer the remainder of tetrafluoroethylene into the 6-liter autoclave, and then the polymerization was further continued. When tetrafluoro-ethylene was completely transferred into the 6-liter autoclave by the pressure-charging of the de-ionized water into the 1.5-liter autoclave, and the internal pressure of the autoclave indicated 10 kg/cm$^2$, the polymerization was stopped. The resulting polymer latex in the autoclave was found to have a resin concentration of 10 percent and a pH value of 2.35. The total quantity of the resulted polymer latex was 4.8 liters, in which 0.192 percent concentration of perfluoro-octanoic acid was present.

This polymer latex was then subjected to salting-out, dehydration, washing, and filtration in the same manner as in Example 4, whereby 21 liters of washed and filtered liquid containing therein perfluoro-octanoic acid and its sodium salt was recovered. The concentration of perfluoro-octanoic acid and its sodium salt in this filtered liquid was found to be 0.0343 percent, which corresponds to 75 percent of the total quantity of the acid used.

This washed and filtered liquid was adsorbed on 50 ml. of a weak basic anion exchange resin "DIAION WA-30," a product of Mitsubishi Kasei Kogyo K.K., Japan, in the same manner as in Example 4. By causing 1.2 normal of ammonia water and de-ionized water in the respectively same quantities as in Example 4 to pass through the adsorbed resin layer, the perfluoro-octanoic acid group which had been adsorbed on the anion-exchange resin was eluted. The eluted liquid thus obtained was found to contain perfluoro-octanoic acid and its ammonium salt, the quantity of which was 89 percent of the liquid as washed and filtered, and its concentration was 0.915 percent.

EXAMPLE 6

In place of perfluoro-octanoic acid used as the emulsifier in Example 4 above, a compound represented by Cl $-(CF_2-CH_2)_6CF_2COOH$ was used. After the pH value of the charge was adjusted to 3.1, the polymerization reaction was conducted in the same manner. The polymerization yield was shown to be 80 percent. Then, the obtained polymer latex was treated in the same operations as in Example 4, whereby 15 liters of washed and filtered liquid was obtained. The quantity of the emulsifier Cl $-(CF_2-CH_2)_6CF_2COOH$ was shown to be 68 percent of the total quantity as initially used. This washed and filtered liquid was caused to pass through a column charged therein with a weak basic anion exchange resin "DIAION WA-10," a product of Mitsubishi Kasei Kogyo K.K., Japan, in the same operation as in Example 2 so as to exchange-adsorb the emulsifier on the anion-exchange resin, after which the emulsifier was eluted from the anion exchange resin with 0.95 normal of ammonia water in the same manner as in Example 2. In 700 ml. of the eluted liquid thus obtained, there was present the carboxylic acid in the form of its ammonium salt, and the rate of recovery thereof was 91 percent in the washed and filtered liquid. To this eluted liquid, 200 milliliters of sulfuric acid was added to deposit Cl $-(CF_2-CH_2)_6CF_2COOH$, which was then filtered with filtration paper. The carboxylic acid was obtained at a quantity of 5.7 g.

EXAMPLE 7

Into an autoclave of 6-liter capacity, there were charged 3,600 g of de-ionized water, 12 g of perfluoro-octanoate, 1.2 g of ammonium persulfate, and 0.36 g of sodium bisulfite, and, in the same manner as in Example 5, 1,200 g of chlorotrifluoroethylene (CClF = $CF_2$) was polymerized at a temperature of 40°C. The resulting polymer latex was subjected to salting-out, dehydration, washing, and filtration in the same manner as in Example 4, and 18 liters of washed and filtered liquid was obtained therefrom. The perfluoro-octanoate contained in this liquid amounted to 78 percent of the total quantity thereof as initially used.

Furthermore, the washed and filtered liquid was caused to pass through a column of a weak basic anion exchange resin "AMBERLITE IRA-93" in accordance using the same operation as in Example 4 so as to exchange-adsorb the perfluoro-octanoate on the ion-exchange resin, after which the adsorbed emulsifier was eluted with ammonia water. The quantity of the perfluoro-octanoate contained in 700 ml. of the eluted liquid thus obtained was found to correspond to 92 percent of that in the washed and filtered liquid.

EXAMPLES 8 to 11

Various fluorinated carboxylic acids were used as the emulsifier instead of perfluoro-octanoic acid used in Example 4 above, and similar types of washed and filtered liquids were obtained from treatments of the respective, resulted polymer latex. By causing each of these washed and filtered liquids to contact the weak basic anion exchange resin "AMBERLITE IRA-93," the fluorinated carboxylic acids were adsorbed on the anion-exchange resin, thereafter eluted liquids were obtained from each of the adsorbed resin with the emulsifier. The results of adsorption and elution are as shown in the following Table 5.

(Table 5)

| Ex. No. | Fluorinated Carboxylic Acids | Adsorbed Qty. (m mol/l) | Rate of Adsorption (%) | Eluted Qty. (m mol) | Rate of Elution (%) |
|---|---|---|---|---|---|
| 8 | Cl$-(CF_2-CClF)_3CF COOH$ | 31.2 | 97 | 28.1 | 90 |
| 9 | F$-(CF_2)_7COOH$ | 34.0 | 96 | 31.6 | 93 |
| 10 | F$-(CF_2)_9COOH$ | 28.4 | 95 | 26.6 | 95 |
| 11 | Cl$-(CF_2-CH_2)_\sim CF_2COOH$ | 32.5 | 92 | 19.6 | 91 |

EXAMPLE 12

To the eluted liquid of perfluoro-octanoic acid obtained in accordance with the procedures set forth in Example 4 above, there was added an aqueous solution of sulfuric acid (1:1) to deposit perfluoro-octanoic acid in the liquid. The deposited emulsifier was filtered, washed, and dehydrated to obtain 42 g of crude perfluoro-octanoic acid. Further, there was conducted distillation under a reduced pressure of 100 mm Hg to purify this crude perfluoro-octanoic acid, as the result of which 25.4 g of a colorless solid substance was obtained as a principal distilled component of 130° – 135°C. The melting point of this perfluoro-octanoic acid was found to be 45 to 46°C, and the purity thereof by titration with alkali was 98.9 percent. Also, the surface tension of the emulsifier was 15.2 dyn/cm (at 25°C) which was comparable with the perfluoro-octanoic acid as initially used. The thus recovered perfluoro-octanoic acid was used as the emulsifier to produce polyvinylidene fluoride by the emulsion-polymerization in the same manner as in Example 4. The resulted polymer exhibited good heat stability, and the other physical properties comparable with the polymers produced by the known methods.

What we claim is:

1. A method for recovering a fluorinated carboxylic acid from a dilute aqueous solution, which comprises contacting a weak basic anion exchange resin with a dilute aqueous solution of a fluorinated carboxylic acid of the formula X $-(CYZ-CF_2)_nCOOM$, where X is H, Cl, F, $CF_3$, or $CF_2Cl$; Y is H or F; Z is H, Cl, or F; M is H, $NH_4$, K or Na; and n is an integer of 2 to 6, and containing a total of 5–13 carbon atoms in the X $-(CYZ-CF_2)_n$ group to adsorb the fluorinated carboxylic acid onto the basic anion exchange resin, and then contacting the anion exchange resin with an aqueous solution of $NH_3$ as an eluent to transfer the fluorinated carboxylic acid from the anion exchange resin into the eluent to isolate the fluorinated carboxylic acid; said weak basic anion exchange resin (a) containing at least one amine group, as an exchange group selected from primary, secondary and tertiary amines, and (b) having a pH in the range of 0 to 7.0

2. A method according to claim 1 wherein the weak basic anion exchange resin is a copolymer selected from the group consisting of copolymers of styrene and divinyl benzene containing a weak base selected from the group consisting of primary, secondary and tertiary amines.

3. The method according to claim 1, wherein the pH value of the aqueous solution of the fluorinated carboxylic acid before the step of the anion exchange resin treatment, is adjusted to less than 4.

4. The method according to claim 1, wherein the concentration of the aqueous solution of $NH_3$ to be used as the eluent ranges from 0.5 to 2.0 normal.

5. The method according to claim 1, in which said aqueous solution of fluorinated carboxylic acid is one selected from the group consisting of a mother liquid obtained after the fluorinated olefin polymer has been isolated by deposition from a polymer latex thereof and containing therein the fluorinated carboxylic acid, and a waste liquid obtained from washing the fluorinated olefin polymer as separated from the polymer latex.

* * * * *